United States Patent [19]
Wilt, Jr. et al.
[11] 4,199,549
[45] Apr. 22, 1980

[54] METHOD OF OPERATING AN INCINERATOR

[75] Inventors: Charles R. Wilt, Jr., Upper St. Clair Township, Allegheny County; Floyd L. Schauermann, Gibsonia, both of Pa.

[73] Assignee: Salem Corporation, Pittsburgh, Pa.

[21] Appl. No.: 858,357

[22] Filed: Dec. 7, 1977

Related U.S. Application Data

[60] Division of Ser. No. 619,058, Oct. 2, 1975, Pat. No. 4,087,923, which is a continuation-in-part of Ser. No. 467,647, May 7, 1964, abandoned, which is a division of Ser. No. 396,668, Sep. 13, 1973, Pat. No. 3,868,779.

[51] Int. Cl.[2] .......... B01D 53/34

[52] U.S. Cl. .......... 423/210; 423/245; 422/62; 422/108; 422/111; 432/72; 110/185; 110/204

[58] Field of Search .......... 423/210 C, 245; 34/32, 34/54, 74, 79, 212; 422/62, 108-111; 431/5, 12; 432/72; 110/185, 191, 203-207, 210, 214, 245

[56] References Cited

U.S. PATENT DOCUMENTS

| | | | |
|---|---|---|---|
| 2,795,054 | 6/1957 | Bowen | 34/72 |
| 3,314,159 | 4/1967 | Betz | 34/72 |
| 3,472,498 | 10/1969 | Price et al. | 431/5 |
| 3,509,834 | 5/1970 | Rosenberg et al. | 110/8 |
| 3,601,900 | 8/1971 | Erisman et al. | 34/79 |
| 3,604,824 | 9/1971 | Handison | 432/72 |
| 3,648,630 | 3/1972 | Hobbs et al. | 110/204 |
| 3,706,445 | 12/1972 | Gentry | 34/79 X |
| 3,749,031 | 7/1973 | Burden, Jr. | 110/204 |
| 3,787,171 | 1/1974 | Cromp | 432/72 |

*Primary Examiner*—Earl C. Thomas
*Attorney, Agent, or Firm*—Buell, Blenko & Ziesenheim

[57] ABSTRACT

The specification discloses and describes a method and means of operating an incinerator whereby the concentration of evaporated solvent or other combustible materials delivered to an incinerator is controlled as a reflection of the temperature of the gas stream made up of products of combustion exhausted from the incinerator. By maintaining the fuel input to the incinerator constant and also maintaining the temperature of the stream of gases entering the incinerator constant, the variation of the temperature of the stream of products of combustion emitted from the incinerator with respect to a standard value reflects the variation in the concentration of evaporated solvents or other combustibles in the stream of gases supplied to the incinerator. A valve means, responsively controlled according to the temperature of the stream of products of combustion emitted from the incinerator, functions to regulate the quantity of the stream of gases including diluents, such as air, admitted to the incinerator, thereby regulating the concentration of evaporated solvent and other combustibles evolved to a substantially constant and safe value and incidentally controlling to a uniform temperature the stream of gas products of combustion at the outlet of the incinerator. The method and means may be used in connection with ovens employed in a drying process wherein combustible material of vaporous, solid or liquid form, are carried in a gaseous stream to the incinerator.

7 Claims, 3 Drawing Figures

METHOD OF OPERATING AN INCINERATOR

Figure 1:
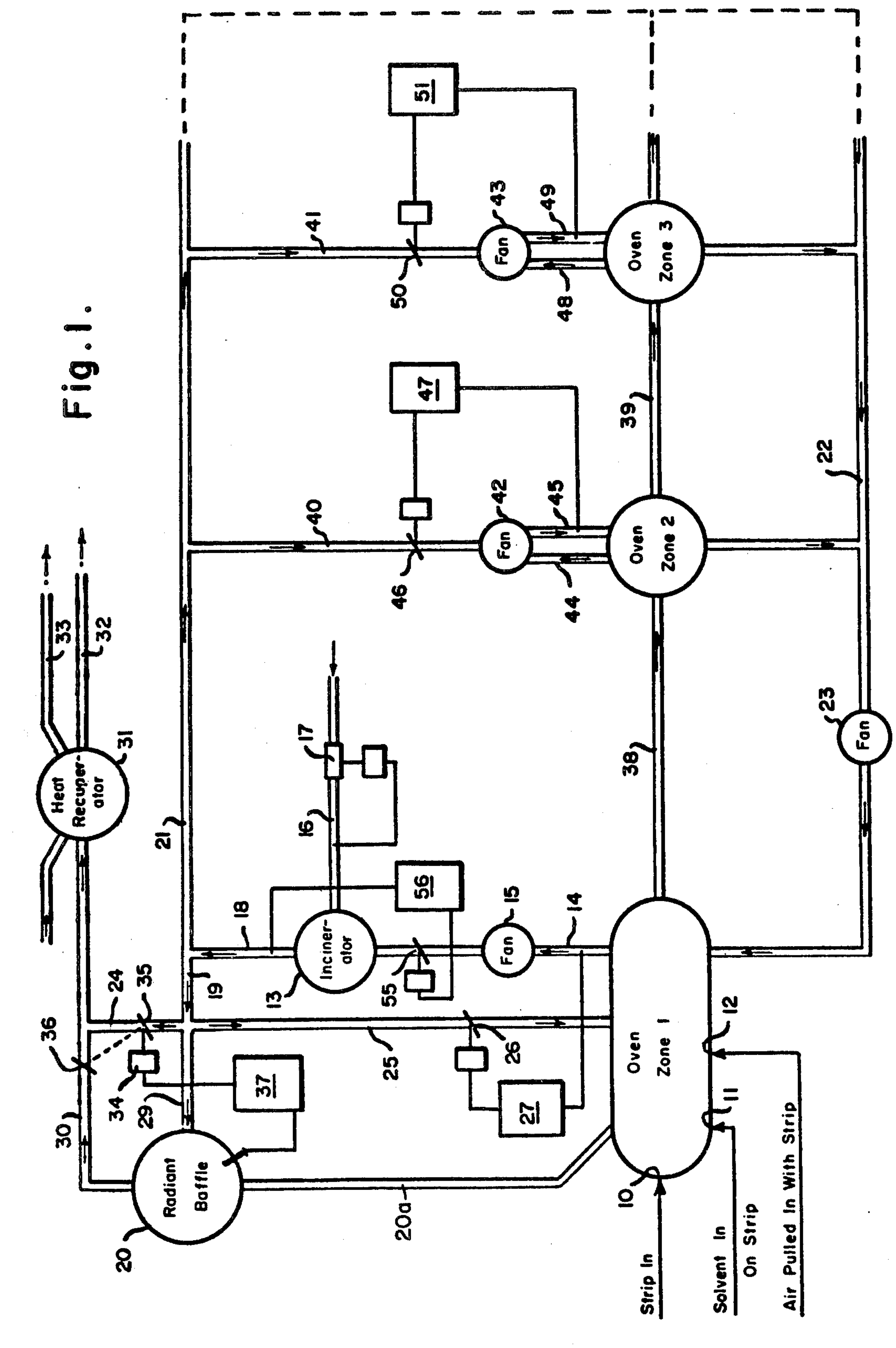

This application is a division of Ser. No. 619,058, filed Oct. 2, 1975, now U.S. Pat. No. 4,087,923 issued May 9, 1978, which is a continuation-in-part of Ser. No. 467,647, filed May 7, 1964, and now abandoned, which application in turn is a division of our application Ser. No. 396,668, filed Sept. 13, 1973, now U.S. Pat. No. 3,868,779 issued Mar. 4, 1975.

This invention relates to a method and means for operating an incinerator by which combustible materials of a gaseous, vaporous, liquid or solid form carried in a gaseous stream to the incinerator are oxidized so as to effectively eliminate emission of obnoxious pollutants to the atmosphere. The invention includes dilution control apparatus for regulating concentration of the combustible materials in the gas stream to a safe value while insuring that the proper temperature level is maintained in the incinerator to oxidize the pollutants.

In paint drying systems in which the painted product is moved on a conveyor through a drying oven, solvent from the paint on the product is evaporated into the oven drying zone. Similarly in a coal drying system in which powdered coal in compacted form is conveyed through drying ovens, particles of coal dust are evolved from the product into the space within the drying zone incidental to the drying process. In both cases, it is desirable to remove the solvent and coal dust from the oven zone by carrying them in a gaseous stream to an incinerator where they are burned.

It is desirable to provide a method of incinerating the combustible material in the gaseous stream to the incinerator which effectively eliminates emission of obnoxious pollutants to the atmosphere from the incinerator. It is furthermore desirable to provide a method of operating an incinerator in such a way as to control the concentration of the combustible material in the gas stream to the incinerator to avoid the possibility of damaging explosions.

In order to safeguard against explosion in the solvent evaporative zone of an oven, such as are included in paint drying oven systems, the National Fire Protective Association recommends dilution of the solvent vapor to 25% of the lower explosive limit (L.E.L.), that is 25% of the volumetric concentration of solvent at which a gaseous mixture will explode.

Usually, solvent dilution in an oven is achieved by a fan or blower pulling fresh air into the oven. Because of the heat required to heat the fresh air drawn into the oven to oven temperatures, it is preferable to recirculate gases discharged from the incinerator back to the oven for dilution purposes partly because these gases are already heated and the fuel requirement with respect to that for heating fresh air is thus reduced, and partly because the recirculated gases contain carbon dioxide, nitrogen and water vapor, in addition to air, and these gases are better diluents for preventing an explosion than is air alone.

An oven is designed for a fixed maximum amount of combustible solvent and in order to limit the solvent concentration, within the oven, to approximately 25% of the L.E.L., a fan or blower of correspondingly appropriate capacity is required to insure that the proper amount of diluent is pulled into the oven. A safe rule is to provide 10,000 standard cubic feet of gaseous diluent, such as air, for each gallon of solvent, or at an air density of 0.075 lb./ft.$^3$, 750 lbs. of air per gallon of solvent.

Assuming a maximum solvent load of 100 gallons/hr., it follows that 75,000 lbs. of air or diluent an hour will be required. Since solvent weights may be taken as an average of 7.5 lbs./gallon, 100 gallons of solvent will weight 750 lbs. Since the weight of solvent evolved thus represents only 1% of the total weight of air or diluent per hour, the solvent weight may be neglected without seriously affecting the accuracy of the calculations. Accordingly, under the assumed conditions of maximum solvent load, the appropriate capacity of fan required to maintain a safe percentage concentration of solvent is 75,000 lb./hr. $\div$ 0.075 lb./ft.$^3$ or $1\times10^6$ cu. ft. per hour.

When the oven is operated at a solvent input rate less than the fixed maximum rate, if the volume of diluent passing through the oven at the maximum fan capacity is maintained, it is more than that required to maintain the 25% L.E.L. Moreover, if the diluent intake to the oven corresponding to the maximum fan capacity is maintained, the fuel requirement to heat this diluent at the incinerator will be increased because of the loss of heat input otherwise contributed by the solvent.

If it were possible to directly measure the volume or weight of solvent being evaporated in the oven, conceivably it would be possible to reduce the speed of the fan pulling diluent into the oven, to thereby reduce the volume or weight of diluent passing through the oven, with a consequent saving of fuel to heat the diluent with respect to that which would otherwise be required. With present-day equipment, however, it is not practical to directly measure the volume or weight of solvent being evaporated in an oven. Moreover, present-day devices for measuring concentrations of vapor, gases, liquids and solids in a gaseous stream are not sufficiently reliable to be used efficiently for control purposes.

We are aware of generally pertinent prior art patents, such as U.S. Pat. No. 3,472,498 issued Oct. 14, 1969 to H. A. Price et al. and U.S. Pat. No. 3,706,445 issued Dec. 19, 1972 to Charles B. Gentry relating to incinerator control systems. These patents disclose apparatus for recirculation of incinerator exhaust gases to an oven, such as a paint drying oven, to reduce fuel requirements for the oven. However, they do not disclose any means for measuring, determining or controlling the concentration of evaporated solvent in the oven.

The amount of solvent in a paint conveyor drying line may vary because of variation in line speed, load surface area, type of coating, or coating thickness. With a constant diluent flow rate based on maximum solvent load the evaporated solvent concentration in a paint drying oven may thus be substantially lower than the permissible percent L.E.L. over prolonged periods of time. If the solvent concentration in the gas mixture exhausted from a drying oven and delivered to an incinerator decreases, additional fuel is required to be supplied to the incinerator to maintain the appropriate temperature within the incinerator for effective oxidation of the solvent. The evaporated solvent delivered to the incinerator has very high chemical heat content of the order of 100,000 B.T.U. per gallon. Consequently, the loss of this heat, occasioned by a reduced volume of solvent delivered to the incinerator, must be compensated for by heat furnished by additional fuel supplied directly to the incinerator. The cost of this additional fuel is substantial over a period of time.

If the cost of the additional fuel were to be disregarded, it would be possible to simply regulate the supply of fuel to the incinerator automatically or manually in direct response to variations in the temperature of the stream of gaseous products of combustion emitted at the exhaust outlet of the incinerator while maintaining a constant diluent rate. However, if reliable combustible analyzers were available conceivably such an analyzer could be arranged to automatically control the speed of the fan or otherwise reduce the fan capacity, so as to reduce the volume of diluent drawn into the oven thereby maintaining the percentage of concentration of the solvent. However, due to the current lack of reliable combustible concentration analyzers, the automatic control of the volume of diluent in this manner is not feasible.

It is a purpose of this invention to provide a method of operating an incinerator for burning combustible materials of solid, liquid or vaporous nature carried in a gaseous stream to the incinerator, which method comprises the steps of (1) regulating to a constant rate the fuel input to the incinerator, (2) controlling to a substantially constant value the temperature of the gaseous stream entering the incinerator, and (3) controlling the amount of diluent pulled into the oven as a function of the temperature of the gaseous stream constituting the products of combustion leaving the incinerator.

It is a further purpose of this invention to provide a novel method and arrangement for automatically regulating the combustible concentration in the gas mixture within a paint drying oven to a safe percentage of the lower explosive limit (L.E.L.) by controlling the weight flow of gas mixture from the oven to the incinerator as a function of the temperature of the gas mixture or stream comprising the products of combustion emanating from the incinerator at an exhaust outlet thereof.

It is moreover a purpose of this invention to provide a novel method and means for controlling the operation of an incinerator for combustion of noxious solvent vapors, derived from a paint drying oven or other source, to insure a constant operating temperature thereof without variation of the normal supply of fuel thereto, notwithstanding variation of the concentration of solvent vapors delivered thereto.

It is furthermore the purpose of this invention to provide the foregoing methods and arrangements while avoiding the difficulties and objectionable features of heretofore known incineration controls.

To attain the aforesaid purposes and overcome the objections, we provide apparatus comprising an incinerator with means for regulating the supply of fuel thereto to a constant rate, a drying oven or other processing enclosure having at least one zone in which combustible material is evolved from a product undergoing processing and supplied in a gaseous stream to the incinerator, thermal responsive apparatus for regulating the recirculation of products of combustion from the incinerator to maintain a constant temperature of the gaseous stream entering the incinerator, and a thermally-controlled valve and a blower means for controlling the quantity of gaseous mixture expressed in terms of weight, entering the incinerator as a function of the temperature of the gaseous stream at the outlet of the incinerator.

Our invention is based on the principle that, with a constant fuel input to an incinerator and a constant temperature of a stream of gases entering the incinerator, variations in the temperature of the stream of products of combustion emanating from the incinerator reflect variations in the concentration of solvent or other combustible material, such as coal dust, in the gas mixture delivered to the incinerator. The temperature of the products of combustion emanating from the incinerator may be regulated to a constant value by controlling the concentration of combustible material in the gas mixture delivered to the incinerator. The concentration of combustibles is regulated by controlling the amount of diluent pulled into the process. This principle may be demonstrated mathematically as follows. For simplicity, a diagram hereinafter identified as FIG. 3 of the drawings, will be referred to.

Using the following quantities and symbols therefor, heat and weight balances may be mathematically expressed as follows:

Q = BTU/Hr
W = Pounds/Hr
H = Chemical heat content, minus latent heat of water vapor in BTU/Pound
CP = Specific Heat - BTU/LB
T = Temperature Degrees Rankin
Stream subscript notation (See Figure 3)
d = Diluent
s = Combustible gas or vapor liberated in generator
m = Mixed diluent and combustible
f = Air and/or fuel to incinerator
c = Mixed stream of products of combustion and diluent Heat Balance at Incinerator I. $Qc = Qf + Qm$ Weight Balance at Incinerator II. $Wc = Wm + Wf$ But $Wm = Ws + Wd$ ∴

IIA. $Wc = Ws + Wd + Wf$

But:

IIIA. $Qc = (Wc)(CPc)(Tc)$

IIIB. $Qf = (Wf)(Hf)$

IIIC. $Qm = (Ws)(Hs) + (Ws)(CPs)(Tm) + (Wd)(CPd)(Tm)$

Substituting IIIA, IIIB, & IIIC in I yields:

IV. $(Wc)(CPc)(Tc) = (Wf)(Hf) + (Ws)(Hs) + (Ws)(CPs)(Tm) + (Wd)(CPd)(Tm)$

Substituting IIA in IV and expanding yields:

V. $(Wd)(CPc)(Tc) + (Ws)(CPc)(TC) + (Wf)(CPc)(Tc) =$
$(Wf)(Hf) + (Ws)(Hs) + (Ws)(CPs)(Tm) + (Wd)(CPd)(Tm)$

Re-arranging and collecting yields:

VI. $Wd((CPc)(Tc) - (CPd)(Tm) = Wf(Hf - (CPc)(Tc)) + Ws(Hs + (CPs)(Tm) - (CPc)(Tc)$

But: The following are constants (or essentially so) in the process.

CPc, Tc, CPd, Tm, Hf, Hs, Cps

-continued

Let $K1 = (CPc)(Tc) - (CPd)(Tm)$ $K2 = Hf - (Cpc)(Tc)$ $K3 = Hs + (CPs)(Tm) - (Cpc)(Tc)$

Substituting the above constants K1, K2, & K3 in VI yields:

VII. $K1(Wd) = K2(Wf) + K3(Ws)$

Dividing by Ws yields:

VIII. $K1(Wd/Ws) = K2(Wf/Ws) + K3$

By definition, the lowr explosive limit (L.E.L.) is the minimum ratio of combustible volume to oxidizer volume (usually air) that produces an explosive mixture. This ratio may also be expressed as a weight ratio.

L.E.L. = Pounds of combustible/Pound of diluent.

The percent of the lower explosive limit (% L.E.L.) may be defined as the ratio of the actual pounds of combustible/pound of diluent to the L.E.L.

VIIIA. $\%\,LEL = (Ws/Wd) / L.E.L.$ or

IX. $Wd/Ws = ((\%\,LEL)(LEL)^{-1}$

Substituting IX in VIII yields:

$K1/((\%\,LEL)(LEL)) = K2(Wf/Ws) + K3$

Re-Arranging:

X. $Wf = \frac{Ws}{K2}((K1/((\%\,LEL)(LEL)) - K3)$ or

XA. $\%\,LEL = (K1)(Ws)//(K2(Wf) + K3(Ws))\,LEL))$

Consider the following example for a maximum combustible liberation rate of 650 lb/hr with a L.E.L. of .0312 (3.12% combustible in air by weight) and a % L.E.L. requirement of 25.0% (.250 as decimal). Let K1, K2, & K3 be computed from constants with the following values.

CPc = 0.274 BTU/lb./° R

CPs = .442 BTU/lb./°R (Hexane)

CPd = .245 BTU/lb./°R

Tc = 1950°R

Tm = 860°R

Hf = 21,500 BTU/lb. net (Methane)

Hs = 19,400 BTU/lb. net (Hexane)

$K1 = .274(1950) - .245(860) = 324$ $K2 = 21{,}500 - .274(1950) = 21{,}000$ $K3 = 19{,}400 + .442(860) - .274(1950) = 19{,}200$

From equation x $Wf = \frac{Ws}{K2}((K1/((\%\,LEL)(LEL)) - K3)$ $WF = \frac{650}{21{,}000}((324/((.25)(.0312)) - 19{,}200)$ Wf = 691 lb./hr.

From equatin VII $324\,Wd = 21{,}000(691) + 19{,}200(650)$

Wd = 83,300 lb./hr.

At a combustible rate of 65 lb./hr. and a constant rate of fuel input to the incinerator, the new %LEL may be found by substituting in equation XA as follows:

$\%LEL = (324)(65)/([(21{,}000)(691) + (19{,}200)(65)](0.0312))$ $\%LEL = 0.0428$ or 4.28%

Had the system been operated with a constant diluent supply rate, the resulting %LEL from equation VIIIA would have been:

$\%LEL = (65/83{,}300)/0.0312 = 0.025$ or 2.5%

The required rate of fuel input for a constant rate of diluent supply from equation X yields:

$$Wf = \frac{65}{21{,}000}((324/((.025)(.0312)) - 19{,}200) = 1{,}226 \text{ lbs./hr.}$$

It will be apparent that the combustible concentration control afforded by the system of the present invention requires less fuel to operate the incinerator than does a system providing a constant diluent supply. Thus in the example employed, a reduction of combustible from 650 lb/hr to 65 lb/hr, the consumption of fuel for our concentration control system would be 691 #/hr. (maintained constant) whereas if the diluent supply were maintained unchanged and the fuel requirement adjusted to maintain proper operating temperature in the incinerator, the fuel requirement would be 1226 #/hr. Thus the combustible concentration control afforded by our invention requires only 691/1226 or 56.3% of the fuel required by the constant diluent type of system under the situation assumed.

In like manner it can be demonstrated that at any other combustible liberation rate less than maximum, the fuel requirement is less for the present invention than for a system in which the diluent supply is unchanged. It should be understood that, as used herein, the term "constant fuel input" refers to a given set of operating parameters for the incinerator. If any of the constants used to determine K1, K2 or K3 are changed, the value of Wf must also be adjusted. If we wish to vary the maximum value of Ws, Wf must also vary. Thus Wf may be varied by manual or automatic control to suit the operating parameters of the incinerator and thereafter the fuel input will remain constant for the given set of parameters.

Figure 2:
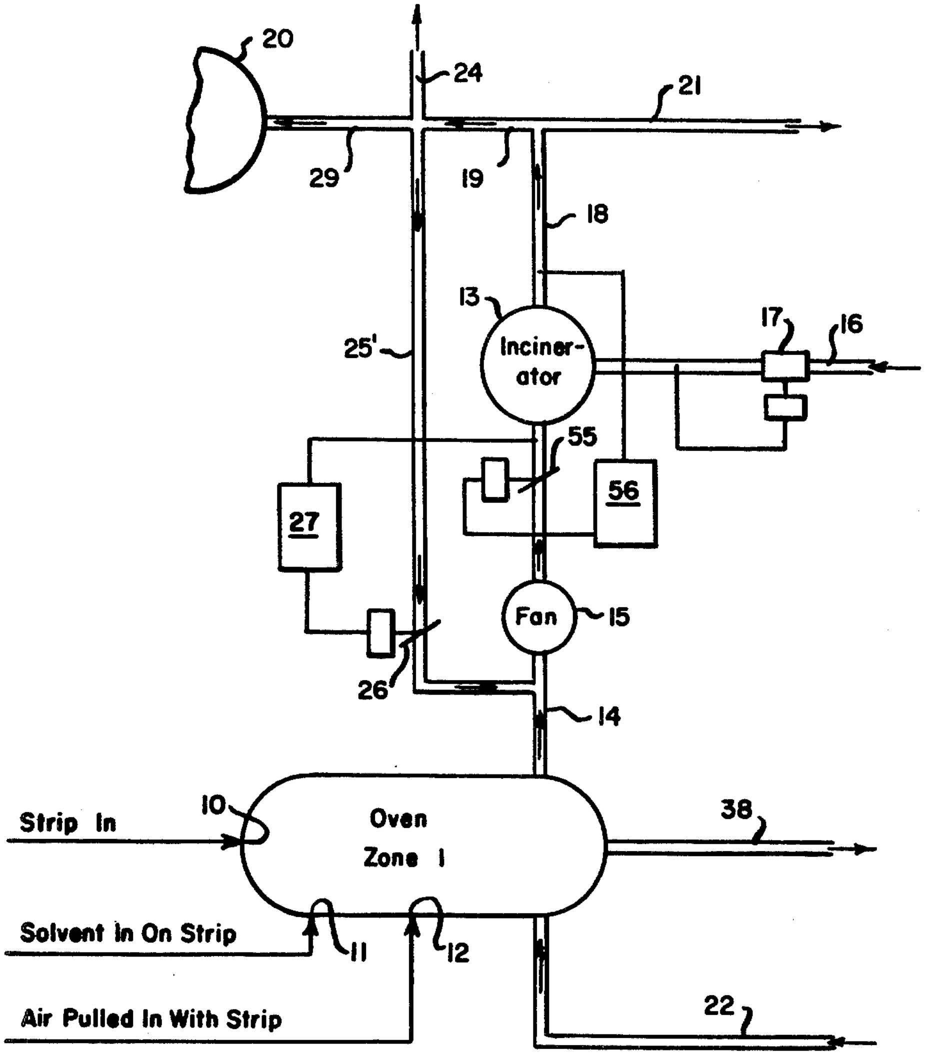
Figure 3:
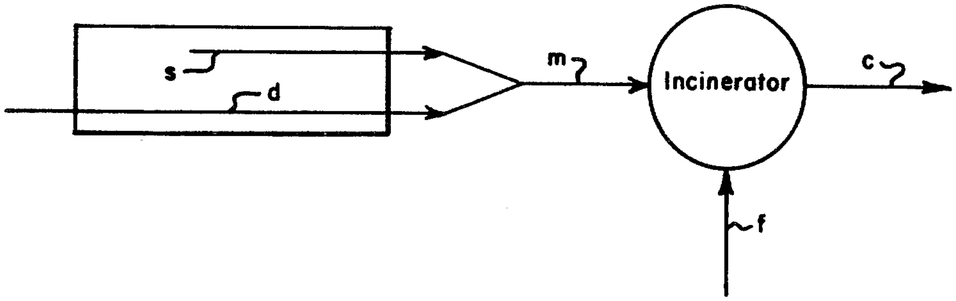

A preferred embodiment of the means for and method of practicing the invention is described hereafter and shown in the accompanying drawings, wherein:

FIG. 1 depicts diagrammatically a paint drying conveyor line with radiant type solvent evaporation zone, FIG. 2 shows a modified arrangement with regard to recirculation of the product of combustion gases, and FIG. 3 is a diagram employed in the mathematical analysis of the principles of this invention.

Referring to FIG. 1 of the drawings, the apparatus comprising the paint drying conveyor system includes a housing enclosing a series of spaced solvent evaporation and curing ovens zones, designated Zone 1, Zone 2 and Zone 3. For brevity, additional oven zones are omitted and represented merely by the broken line paralleling Zone 3. Oven Zone 1 has an inlet 10 for a conveyor carrying a painted product to be dried. Also shown, diagrammatically, are an inlet 11 for solvent and an inlet 12 for air. Actually, the air enters the oven through oven inlet 10 with the product and the solvent enters as part of the product coating.

Associated with the oven Zone 1 is an incinerator 13 which is in communication with the oven Zone 1 via ductwork 14 in which is included a blower or fan 15 for supplying the exhaust gas mixture from the oven solvent evaporation Zone 1 to the incinerator 13. Connected to the incinerator 13 is a fuel line 16 having a valve 17 therein which is automatically controlled to regulate the rate of fuel supply to the incinerator to a constant value. A conventional manually controlled valve (not shown) is provided in fuel line 16 for optional manual control.

Connected to the incinerator 13 is an exhaust gas outlet duct 18 which divides into two branches. One branch, designated 19 goes to a radiant baffle 20 which physically surrounds the work in Zone 1 and radiates heat to the work via a passage represented by conduit 20*a*. The second branch of duct 18 is designated 21 and provides passage for incinerator exhaust gases to succeeding oven Zones 2, 3 etc. and via a return duct 22, including a blower fan 23, to the oven Zone 1.

Opening out of duct 19 are three branch ducts, designated 24, 25 and 29. Duct 25 returns or recirculates a portion of the gas products of combustion of the incinerator to the oven Zone 1 under the control of a valve 26 which is controlled responsively to the temperature at the incinerator inlet duct 14, by a suitable thermoresponsive device 27, so as to maintain the temperature of gases constant in duct 14.

The branch duct 29 opening out of duct 19 supplies a portion of the gas products of combustion from the incinerator to the radiant baffle 20 from which the flow continues to a duct 30 leading to a heat recuperator 31. A portion of the heat from recuperator 31 may be recovered from the system via a duct 33 or returned to atmosphere via a duct 32.

For regulating the volume or weight of gases, supplied to the radiant baffle 20, a valve 34 is provided having two inversely operable valve elements 35 and 36. Valve 34 is controlled according to the temperature of the radiant baffle 20 by a thermally-responsive device 37. Valve element 35 is opened to increase the flow of gas mixture through duct 24 to duct 30, with an increase in temperature in the radiant baffle 20, while valve element 36 closes to correspondingly reduce the proportion of gases supplied to the radiant baffle 20. Conversely, upon a reduction of the temperature in the radiant baffle, valve element 35 is operated to reduce flow therepast so as to increase direct flow through duct 29 to the baffle 20, while valve element 36 is opened to accommodate the increased proportion of gas flow therepast from the radiant baffle 20 to the recuperator 31. The temperature of the radiant baffle 20 is thus regulated to a substantially constant temperature.

Diagrammatically, Zones 1 and 2 and Zones 2 and 3 are shown separated by ducts 38 and 39 respectively although the usual arrangement is for the zones to abut and be separated by partial partitions. Portions of the total quantity of gas containing products of combustion from the incinerator 13 flowing through duct 21 are diverted through branch ducts 40 and 41 to Zones 2 and 3 respectively, under the influence of the incinerator fan 15. The duct 40 is connected to the inlet of a fan 42 as is a duct 44 leading out of the Zone 2. A return duct 45 connects the outlet of fan 42 back to Zone 2. The proportion of gas recirculated from Zone 2 relative to that supplied from duct 40 is determined by valve 46 which is controlled by a thermally-responsive device 47 which monitors the temperature of the gas returned to Zone 2 via the duct 45. Thus with an increase of temperature in return duct 45, valve 46 closes to reduce the flow of gas from duct 40 to the Zone 2. Conversely, with a decrease of temperature of gas in the return duct 45, valve 46 opens to increase the flow of gas from duct 40 to Zone 2.

In a similar manner, blower 43 supplies gas proportionally from a duct 48 connected to Zone 3 and from duct 41 to the Zone 3 via a return duct 49. A valve 50 in the duct 41 is controlled by a thermally-responsive device 51 which monitors the temperature of gas in return duct 49.

The gases recirculated to Zones 2 and 3, as just described, flow from the several zones via branch ducts 52 and 53, respectively, to return duct 22, where they are returned to Zone 1 by fan 23. Although most of the solvent is evaporated in Zone 1, minor amounts will be evaporated in Zones 2 and 3 and these must be returned to the incinerator via Zone 1.

In accordance with the objectives of our invention, we further provide a valve 55 in the duct 14 between fan 15 and the incinerator 13, and a thermally-responsive device 56 which monitors the temperature in duct 18, at the outlet of incinerator 13, for controlling the valve 55. Thermally-responsive device 56 is effective responsively to an increase in the temperature of gases in duct 18 at the outlet of incinerator 13 above a predetermined temperature, to cause valve 55 to be operated toward the open position, thereby increasing the flow of air drawn into Zone 1 via passage 12. Conversely, thermally-responsive device 56 is effective, responsively to a decrease in temperature of gases in duct 18 at the outlet of incinerator 13 below the predetermined temperature, to cause valve 55 to be operated toward the closed position, thereby reducing the flow of air drawn into Zone 1 via passage 12. It will be understood that control by valve 55 of the volume of gaseous stream admitted to the incinerator thereby necessarily controls the weight of the gaseous stream, in lbs. per unit of time, flowing to the incinerator.

Let it be assumed that the system is in operation with a conveyor bearing painted products moving progressively through Zones 1, 2 and 3. Also, let it be assumed that valve 17 is operating to regulate to a constant value the rate of fuel supplied to the incinerator and that thermally-responsive device 27 is functioning to regulate a constant temperature in duct 14. Let it also be understood that the solvent concentration in the gases leaving Zone 1 and entering the incinerator 13 is at a safe percentage of the L.E.L. and that the resulting temperature of gases leaving the incinerator is controlled by thermally-responsive device 56.

If, now, the temperature of the gases in duct 18 at the incinerator outlet rises above the predetermined temperature this is an indication that the concentration of solvent in the Zone 1 is increasing. Accordingly, valve 55 is opened to increase the flow of air into the Zone via passage 12, thereby resulting in a reduction in the temperature of gases in duct 18 to the predetermined temperature.

If the temperature of the gases in duct 18 at the incinerator outlet falls below the predetermined temperature, this is an indication that the concentration of the solvent in Zone 1 is reducing. Accordingly valve 55 is operated toward the closed position, thereby reducing the rate of flow of air, that is, quantity per unit of time into Zone 1 via passage 12. In consequence, the concentration of solvent in Zone 1 increases, with the result that the temperature in duct 18 at the outlet of the incinerator is restored to the predetermined temperature.

Referring to FIG. 2, a modified arrangement is shown wherein corresponding parts are designated by the same reference numerals as in FIG. 1. The arrangement in FIG. 2 differs from FIG. 1 in providing a duct 25', in place of duct 25, which by-passes Zone 1 and is connected to duct 14 adjacent the inlet to fan 15. Also the thermally-responsive device 27 is connected to register the temperature of the gases in duct 14 adjacent the inlet to the incinerator and controls a valve 26 in the duct 25'.

In its operation, the arrangement in FIG. 2 functions essentially as heretofore described for FIG. 1, with the exception that there is closer regulation of the temperature of the gases immediately adjacent the inlet to the incinerator.

It will be seen that this invention provides a novel method and arrangement for determining and controlling the concentration of evaporated paint solvent or other evolved combustible material such as coal dust in a drying oven, as well as for controlling the operation of an incinerator to insure a uniform temperature of the gas products of combustion at the outlet of the incinerator notwithstanding variations in the combustible material load or in the degree of combustible material concentration in the gas stream to the incinerator. It will furthermore be seen that this invention provides an incineration control arrangement which enables economical operation with respect to fuel requirements and which also maintains a substantially uniform and efficient operating temperature notwithstanding variations in the chemical heat released incidental to the oxidation of combustible materials.

With the implementation of our invention the reliability of our system in determination of the solvent concentration is such that the system can be operated closer to the L.E.L. ie. instead of 25% of LEL this system can be operated at 50% of the LEL. This change in level of the LEL will change the example of fuel consumption from 691 #/Hr to 48.6 #/Hr with a corresponding change of diluent rate from 83,300 #/Hr to 41,700 #/Hr as shown below:

From equation X $$Wf=650((324/((0.5)(0.0312))-19{,}200/21{,}000$$

$$Wf=48.6\ \#/Hr$$

From equation VII $$Wd=((21{,}000(48.6)+(19{,}200)(650))/324$$

$$Wd=41{,}700\ \#/Hr$$

It will be understood that while the apparatus has been illustratively described as utilized in connection with a paint drying system, the apparatus is equally well usable in connection with other drying processes, such as in coal drying systems. Moreover, it should be further understood that so far as the method of operating an incinerator herein disclosed is concerned, it is immaterial as to the source or character of the products undergoing combustion. The method is suited for use in connection with many other combustible materials such as hydrocarbons, carbon monoxide, hydrogen sulfide, ammonia, etc. Likewise, the term diluent, as herein employed, is not intended to be limited to those specifically identified herein (air and products of combustion) as many other gaseous mediums may be suitably employed as diluents.

Furthermore, while this invention has been described in connection with a radiant heat transfer type of drying oven, it will be understood that the invention is equally applicable to an oven using convective heat transfer in the solvent evaporation zone, or to other sources of noxious solvent vapors. Also, modifications may be made in the apparatus specifically described within the terms of the following claims.

We claim:

1. A method of operating an incinerator for the burning of combustible material supplied thereto with diluents mixed in a gaseous stream, comprising the steps of:

(a) regulating to a constant rate the fuel input to the incinerator, (b) controlling to a substantially constant value the temperature of the mixed gaseous stream entering the incinerator, and (c) controlling the quantity of the mixed gaseous stream entering the incinerator as a function of the temperature of the gaseous stream at the incinerator outlet.

2. A method of operating an incinerator for the burning of combustible materials mixed in a gaseous stream flowing to the incinerator, comprising the steps of:

(a) regulating to a constant rate the fuel input to the incinerator, (b) controlling the temperature of the gaseous stream flowing to the incinerator at a substantially constant value by (i) recycling gaseous combustion products from the incinerator outlet as a diluent to the gaseous stream flowing to the incinerator, (ii) measuring the temperature of the gaseous stream flowing to the incinerator, and (iii) controlling the amount of recycled diluent introduced into the gaseous stream as a function of said temperature in the gaseous stream flowing to the incinerator, and (c) controlling to a predetermined value the temperature of the gaseous combustion products at the incinerator outlet by (i) measuring the temperature of the stream of gaseous combustion products at said incinerator outlet and (ii) controlling the quantity of the mixed gaseous stream introduced into the incinerator as a function of the temperature of the gaseous stream at the incinerator outlet.

3. A method of operating an incinerator, according to claim 1, wherein the combustible materials are solvent vapors.

4. A method for regulating to a substantially constant value the temperature of the gaseous stream of products of combustion at the outlet of an incinerator comprising the steps of:

(a) regulating the fuel input to the incinerator to a substantially constant rate, (b) regulating to a substantially constant value the temperature of the gaseous stream entering the incinerator, and (c) controlling the quantity of the gaseous stream entering the incinerator as a function of the temperature of the gaseous stream of products of combustion at the outlet of the incinerator.

5. A method for controlling within predetermined limits the variations in temperature of the gaseous stream of products of combustion at the outlet of an incinerator for the combustion of solvent vapors, comprising the steps of:

(a) regulating the fuel input to the incinerator to a substantially constant rate, (b) controlling within predetermined limits the temperature of the gaseous stream entering the incinerator, and (c) controlling within predetermined limits the quantity of the gaseous stream entering the incinerator as a function of the temperature of the gaseous stream of products of combustion at the outlet of the incinerator.

6. A method for holding substantially constant the temperature of the gaseous stream of products of combustion leaving the outlet of an incinerator to which combustible materials are supplied in a mixed gaseous stream including at least one gaseous diluent, comprising the steps of:

(a) regulating to a constant rate the fuel input to the incinerator, (b) controlling to a substantially constant value the temperature of the mixed gaseous stream at the incinerator inlet, and (c) controlling the quantity of the mixed gaseous stream flowing to the incinerator as a function of the temperature of the gaseous stream leaving the incinerator outlet.

7. A method for holding substantially constant the temperature of the gaseous stream of products of combustion at the outlet of an incinerator for the combustion of solvent vapors delivered thereto in a mixed gaseous stream with diluents comprising the steps of:

(a) regulating to a constant rate the fuel input to the incinerator, (b) controlling to a substantially constant value the temperature of the mixed gaseous stream delivered to the incinerator, and (c) controlling the concentration of the solvent in the mixed gaseous stream by varying the quantity of the mixed gaseous stream flowing into the incinerator as a function of the temperature of the gaseous stream at the incinerator outlet.

* * * * *

UNITED STATES PATENT AND TRADEMARK OFFICE
CERTIFICATE OF CORRECTION

PATENT NO. : 4,199,549

DATED : April 22, 1980

INVENTOR(S) : CHARLES R. WILT, JR. and FLOYD L. SCHAUERMANN

It is certified that error appears in the above-identified patent and that said Letters Patent are hereby corrected as shown below:

Under "References Cited", the sixth reference should read --Hardison--.

Column 4, in equation V., "(TC)" should be --(Tc)--.

Column 4, in equation VI., "(CPc)" (third occurrence) should be --(Cpc)--.

Column 5, in the line below equation VIII., "lowr" should be --lower--.

Column 5,, equation X., "(LEL))-K3) should read--(LEL))) -K3) --.

Column 5, equation XA., "(Ws)//(K2" should read --(Ws)/((K2--.

UNITED STATES PATENT AND TRADEMARK OFFICE

CERTIFICATE OF CORRECTION

PATENT NO. : 4,199,549

DATED : April 22, 1980

INVENTOR(S) : CHARLES R. WILT, JR. and FLOYD L. SCHAUERMANN

It is certified that error appears in the above-identified patent and that said Letters Patent are hereby corrected as shown below:

Column 5, after "From equation x", the next two equations should read as follows:

$$--Wf = \frac{Ws}{K2} ((K1/((\% LEL)(LEL)) - K3)--$$

$$--WF = \frac{650}{21,000} ((324/((.25)(.0312)) - 19,200)--.$$

Column 9, the last line, "-19,200/21,000" should read -- -19,200)/21,000 --.

Signed and Sealed this

*Nineteenth* Day of *August 1980*

[SEAL]

*Attest:*

SIDNEY A. DIAMOND

*Attesting Officer* *Commissioner of Patents and Trademarks*